United States Patent [19]

Cunningham

[11] 4,214,651
[45] Jul. 29, 1980

[54] FRICTION DISC FOR AN AIRCRAFT BRAKE

[75] Inventor: Joseph A. Cunningham, South Bend, Ind.

[73] Assignee: The Bendix Corporation, Southfield, Mich.

[21] Appl. No.: 958,214

[22] Filed: Nov. 6, 1978

[51] Int. Cl.² .............................................. F16D 65/12
[52] U.S. Cl. ................................. 188/251 R; 188/73.2
[58] Field of Search ................... 188/715, 73.2, 250 B, 188/251 A, 251 M, 251 R; 192/107 M

[56] References Cited

U.S. PATENT DOCUMENTS 3,473,637 10/1969 Rutt ................................. 188/251 R
3,695,406 10/1972 Graham et al. ................. 192/107 M Primary Examiner—Duane A. Reger
Attorney, Agent, or Firm—Leo H. McCormick, Jr.; Ken C. Decker

[57] ABSTRACT

A wheel and brake assembly having a plurality of friction members moved by a pressure plate toward a backing plate to affect a brake application. Each friction member has a metallic drive ring coupled to a carbon disc. The carbon disc on a first friction member engages a portion of the drive ring on adjacent friction members to prevent the passage of air to the coupling that could degrade the carbon disc through oxidization.

10 Claims, 4 Drawing Figures

FRICTION DISC FOR AN AIRCRAFT BRAKE

BACKGROUND OF THE INVENTION

The use of carbon discs as a friction element in aircraft wheel and brake assemblies have gained acceptance as a way of increasing the payload of an aircraft.

In U.S. Pat. No. 3,639,197, it is disclosed how a continuous carbon fiber can provide a carbon disc with the structural unity needed to absorb repeated braking torque. Unfortunately, carbon oxidizes in an oxidizing atmosphere such as air and when the temperature of the carbon is above 800° F. the oxidization increases very rapidly. When carbon friction discs are used in aircraft braking systems, thermal conditions above 800° F. are often experienced. The swept or mated areas of such carbon discs shield each other from the oxidizing effects caused by air, however, the non-swept or mated areas are fully exposed to the oxidizing effects resulting from being exposed to air. Prolonged oxidization of the exposed areas of the carbon discs results in a loss of thermal heat sink capacity and structural strength which ultimately can cause a brake failure.

In U.S. Pat. No. 3,914,508 a method is disclosed for protecting a carbon substrate in a moist environment from oxidation by coating a selected surface thereof with a boron and metallic mixture. However, it is difficult to maintain a uniform coating thickness over the entire peripheral surface and as a result where the coating is limited or absent, deterioration of the carbon substrate often takes place after repeated brake applications.

In a further attempt to protect a carbon friction material, a metal driving ring as disclosed in U.S. Pat. No. 3,473,637, was pressed on to the outer periphery of a carbon disc to establish a unitary structure and thereby prevent oxidation of the non-swept or rubbed area of the carbon disc. During frictional operation when the thermal energy produced is low, such protection is effective. However, as the thermal energy generated during a brake application increases, the unity of the carbon material and steel ring change in direct proportion to the differences in their thermal coefficients of expansion placing a stress on the carbon disc. As a result of such stress, after a repeated number of frictional engagements at high temperatures, structural defects can occur along the periphery of the carbon disc. Thereafter, oxygen in the surrounding air can enter and degrade the underlying carbon friction disc.

U.S. Pat. No. 3,972,395 discloses a protection member which matches the coefficient of friction of the carbon friction disc. The protection member, which includes a woven carbon sheath and a protecting screen, is bonded to the peripheral non-swept surface to protect the underlying carbon friction disc. In order to protect the driving slots on the rotor member, a reinforcing plate is attached to the peripheral surface by a driving pin that extends through the carbon friction disc. Unfortunately, these driving pins are located in a high stress area and under some extreme conditions a structural failure may occur in the area of the driving pins.

In copending U.S. Patent Application Ser. No. 958,213, a series of flexible metal cap members surround the driving splines of a carbon disc. The metal cap members have projections which extend into the root section between the driving splines. These projections are connected together to establish a continuous ring of protection for the peripheral surface of the carbon disc. During a brake application, adjacent carbon disc contact the metal cap members to establish a barrier that prevents the passage of air to carbon discs that could degrade the driving splines through oxidization.

SUMMARY OF THE INVENTION

I have discovered a protection system that reduces the possibility of degradation of a plurality of carbon discs in a wheel and brake assembly resulting from a brake application. The protection system includes a metal drive ring having an inner surface separated from an outer surface by both rubbed and non-rubbed surfaces. A series of drive keys are located on either the inner or outer surfaces of the metal drive ring while a series of slots are located on the other surfaces. Each carbon disc has a friction producing surface that extends from a first peripheral surface to a second peripheral surface. The first peripheral surface has either torsional keys or slots that engage the inner or outer surface of the metal drive ring to establish a coupling between the drive ring and the carbon disc. During a brake application, the wear surfaces adjacent to the second peripheral surface of the carbon disc engage the rubbed surfaces on adjacent metal drive rings to prevent the passage of air to the coupling which could degrade or oxidize the first peripheral surface on an adjacent carbon disc.

It is an object of this invention to provide a protection system for reducing the possibility of oxidization of a carbon disc in a wheel and brake system.

It is another object of this invention to provide a coupling system between a wheel and brake assembly through a series of metal drive rings and concentric carbon disc that reduces the possibility of degradation of the carbon disc as a result of a brake application.

It is a further object of this invention to provide a wheel and brake assembly having a plurality of friction members, each of which includes a metal drive ring loosely coupled to a substantially concentric carbon disc. The carbon disc engages an adjacent carbon disc and a portion of the metal drive rings during a brake application to develop a barrier that prevents the passage of air to an adjacent coupling which could degrade the carbon disc.

It is a still further object of this invention to provide a friction member made of a metallic drive ring and a carbon disc with a coupling that permits the drive ring and carbon disc to expand and contract in response to thermal energy changes without inducing stress in each other.

These and other objects should be apparent from reading this specification and viewing the drawings.

DETAILED DESCRIPTION OF THE INVENTION

Figure 1:
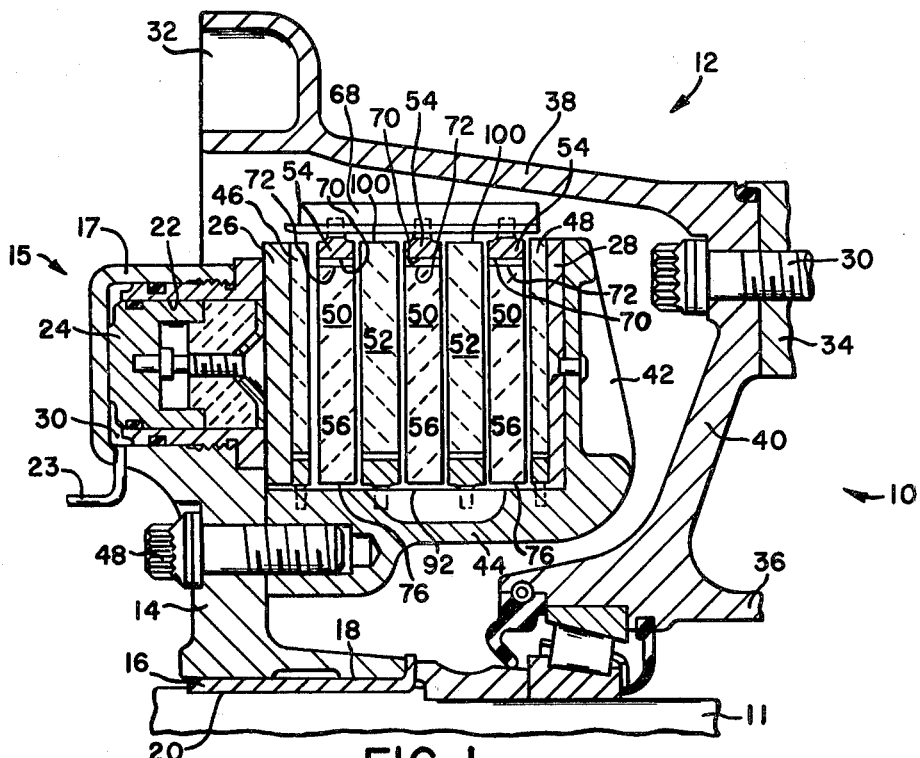
FIG. 1 is a sectional view of a wheel and brake assembly for use on an aircraft having a plurality friction member made according to the principles of this invention.

The wheel and brake assembly 10 shown in FIG. 1 includes a wheel 12, only partially shown that is rotatably mounted on a stationary axle 11 and a brake 15 that is mounted on a stationary carrier member 14 fixed to the axle 11 by locating pin 16 in slots 18 and 20. Since the structure for rotatably mounting wheel 10 to axle 11 and fixing the stationary carrier member 14 to the axle 11 is well known, further description thereof is not deemed to be necessary.

The wheel 12 has a first section 32 that includes a hub 36 and a rim 38 interconnected to each other by a plurality of spokes 40 and a second section 34. The first and second sections 32 and 34 are joined together by a plurality of bolts 30 after a tire is mounted on the wheel 12.

The carrier member 14 contains a plurality of fluid motors 17 (only one is shown in FIG. 1) which are connected to a fluid pressure source through conduit 23.

Each fluid motor 17 has a piston 24 located in a bore 22 that moves a pressure plate 26 toward a backing plate 28 in response to a brake actuation signal in the form of an increase in fluid pressure transmitted through conduit 23 to actuation chamber 30. The backing plate 28 is connected to a flange 42. The sleeve 44 radially projects from sleeve 44 which is secured to the carrier member 14 by a plurality of circumferentially spaced bolts 48.

The disc brake illustrated in FIG. 1 includes a plurality of interleaved rotors 50, which are splined to and are rotated by the aircraft wheel 12 and a plurality of stators 52, which are splined to sleeve 44 of the torque tube. Both the rotors and stators are movable axially by piston 24 and are sometimes referred to as a brake "stack".

The pressure plate 26, which is attached to piston 24 of the fluid motor 16 has a carbon friction pad 46 for forcing the rotors 50 and stators 52 against each other and the entire stack against a carbon friction pad 48 on the backing plate 28. It is the frictional engagement of the rotatable rotors 50 with the stationary stators 52 which produces the braking action of the aircraft wheel.

Figure 2:
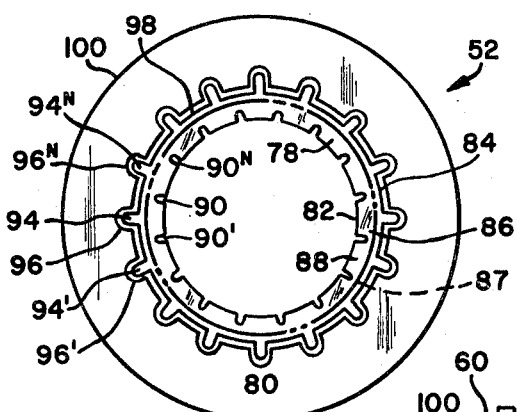
FIG. 2 is an external view of a stator for use in the wheel and brake assembly of FIG. 1.
Figure 3:
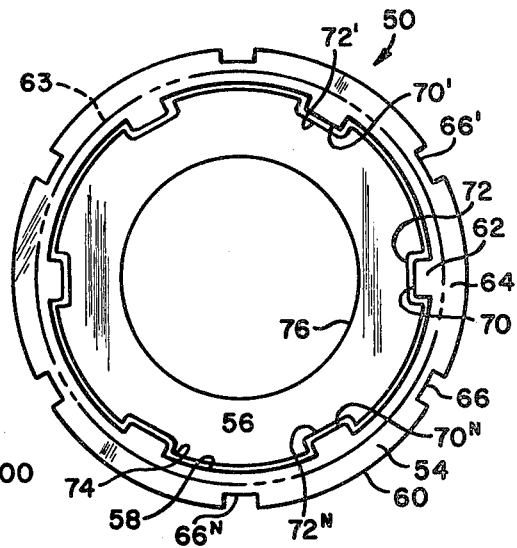
FIG. 3 is an external view of a rotor for use in the wheel and brake assembly of FIG. 1.

Each of the rotors 50, one of which is shown in more detail in FIG. 3, and each of the stators 52, one of which is shown in more detail in FIG. 2, includes a metallic drive ring which surrounds or is surrounded by a carbon friction disc.

In more particular detail, each rotor 50 has a metal drive ring 54 which surrounds a carbon friction disc 56. The metal drive ring 54 has an inner surface 58 separated from an outer surface 60 by a swept or rubbed section 62 and a non-swept or rubbed section 64. As shown in FIG. 3, the limit of the swept section 62 is defined by dashed line 63. The non-swept section 64 has a plurality of slots 66, 66' . . . $66^n$ located on the outer surface 60 which are mated with corresponding keys 68 . . . $68^n$, only one being shown, fixed to rim 38 of the wheel 12. A series of torsional keys 70, 70' . . . $70^n$ which are located on the inner surface 58 of drive ring 54 are matched with a series of slots 72, 72' . . . $72^n$ on peripheral surface 74 of the carbon disc 56. The wear surface of the carbon disc 56 extends from the inner diameter or peripheral surface 76 to the outer diameter or peripheral surface 74. The coupling created through the engagement of keys 70, 70' . . . $70^n$ in slots 72, 72' . . . $72^n$ is designed to have sufficient tolerance between peripheral surface 74 and inner surface 58 such that any dimensional changes in either the carbon disc 56 or the metal drive ring 54 resulting from a temperature change does not place the other member in a stressed condition.

Similarly, each stator 52 shown in FIG. 2 has a metal drive ring 78 surrounded by a carbon disc 80. The metal drive ring 78 has an inner diameter 82 separated from an outer diameter or surface 84 by a swept or rubbed section 86 and a non-swept or rubbed section 88. As shown in FIG. 2, the limit of the swept section 86 is defined by dashed line 87. The non-swept section 86 has a series of slots 90, 90' . . . $90^n$ located on the inner diameter 82 that are matched with corresponding keys 92 . . . $92^n$ on sleeve or barrel 44 of the torque tube and a series of torsional keys 94, 94' . . . $94^n$ located on the outer diameter surface 84 that are mated with slots 96, 96' . . . $96^n$ on the inner peripheral surface 98 of carbon disc 80 to establish a coupling. The wear surface of the carbon disc 80 extends from inner peripheral surface 98 to the outer peripheral surface or diameter 100. Similarly, as with the rotor coupling, tolerance between the outer surface 84 of the metal drive ring 78 and inner peripheral surface 98 of the carbon disc 80 is such that any dimensional changes in the carbon disc 80 and the metal drive ring 78 caused by changes in temperature does not place either member in a stressed condition.

MODE OF OPERATION OF THE INVENTION

When an aircraft is moving on the ground, the tire on wheel 12 engages the ground and rotates the wheel 12. Since rotors 50 are connected to wheel 12, they also rotate while stators 52 remain stationary with respect to axle 11. To operate the brakes, the pilot activates a fluid pressure source (not shown) which is communicated through conduit 23 into chamber 30. This fluid pressure in chamber 30 acts on piston 24 and provides an axial force which moves pressure plate 26 toward backing plate 28 to bring the friction members of the rotors 50 and stators 52 into frictional engagement. This frictional engagement converts mechanical energy to thermal energy in the rotors 50 and stators 52.

Figure 4:
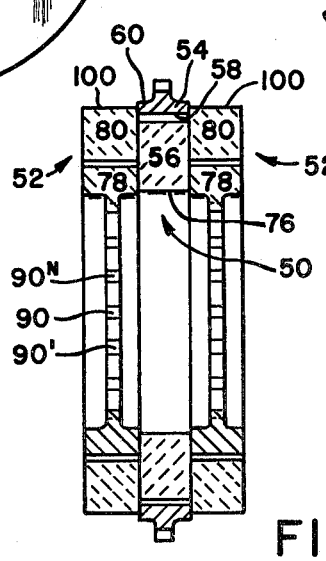
FIG. 4 is a sectional view of a portion of the stators and a rotor of FIG. 1 showing the relationship between the friction members during a brake application.

As shown in FIG. 4, the wear surface on carbon disc 80 of each stator 52 engages the carbon disc 56 and the swept surface 62 on the metal drive ring 54. Similarly, the wear surface on carbon disc 56 of each rotor engages carbon disc 80 and the swept surface 86 on metal drive ring 78.

Thus, during a brake application, with the stators 50 and rotors 52 moved toward the backing plate 28 by the pressure plate 26, a barrier is created that prevents the passage of air to the couplings between the metal drive rings and the carbon discs. Without oxygen from the air being available to combine with the carbon discs, the drive splines are protected from degradation and thus the structural strength is not reduced after repeated brake engagements.

It should be noted that the metallic drive rings 78 and 54 act as heat shields to inhibit the transfer of thermal energy toward the wheel 12 and the torque tube 44. Thus, the pressure of the fluid in the tires is not increased substantially by the heat generated in the brake 15.

Since the metal drive rings 54 and 78 and the carbon friction discs 56 and 80 of each rotor 50 and stator 52 have the same thickness, the rubbed surfaces 62 and 86 produce friction when engaged with the carbon discs. However, as the brake lining wears, these rubbed surfaces 62 and 86 of the metallic drive rings also wear and must be replaced with the carbon friction discs when the brake is relined.

I claim:

1. In a wheel and brake assembly having a series of disc members which are moved into engagement with each other to effect a brake application, each of said disc members being subjected to degradation caused by oxidation resulting from a brake application, the improvement wherein each disc member comprises:

a metallic drive ring having rubbed surfaces and non-rubbed surfaces, said drive ring having a first series of drive slots adjacent to said non-rubbed surfaces and a series of torsional keys adjacent to said rubbed surfaces; and a carbon friction member having friction producing surfaces that extend from a first peripheral surface to a second peripheral surface, said first peripheral surface having a second series of drive slots thereon which engage said series of torsional keys to establish a coupling, said coupling having sufficient flexibility to permit said metallic drive ring and said carbon friction member to respond to temperature levels without affecting each other, said friction producing surfaces adjacent to said second peripheral surface engaging said rubbed surfaces on adjacent metallic drive rings to establish barriers which inhibit the passage of air to said coupling during a brake application and thereby prevent degradation to said first peripheral surface.

2. In the wheel and brake assembly as recited in claim 1 wherein:

a portion of said disc members are rotors, each of said first series of drive slots on said rotors being connected to said wheel, said wheel on engaging the ground and during a brake application initiated developing a torque that is transmitted through said first and second series of drive slots to said carbon friction member.

3. In the wheel and brake assembly as recited in claim 2 wherein:

a portion of said disc members are stators, each of said first series of drive slots on the metallic drive ring of said stators being connected to a rotatably fixed brake torque tube to hold the carbon friction members stationary.

4. In the wheel and brake assembly as recited in claim 3 further including:

a first disc member of said stator portion is attached to said brake torque tube to establish a backing plate member, said first disc member having a friction surface constructed of carbon and a metal ring.

5. In the wheel and brake assembly as recited in claim 4 further including:

a second disc member of said stator portion attached to said actuator for establishing a pressure plate, said actuator moving said pressure plate toward said backing plate to compress the rotor disc between said stator disc, said second disc member having a friction surface constructed of carbon to establish said barrier with a first rotor.

6. In the wheel and brake assembly as recited in claim 1 wherein said metallic drive rings and carbon friction members of said stators and rotors move axially independently of each other in response to movement of said pressure plate toward said backing plate.

7. In a wheel and brake assembly having a series of friction members moved by a pressure plate toward a backing plate to effect a brake application, each of said friction members being subjected to degradation caused by oxidation, the improvement wherein each friction member comprises:

a metallic drive ring having an inner surface separated from an outer surface by swept surfaces and non-swept surfaces, one of said inner and outer surfaces having keys extending therefrom and the other having slots therein; and a carbon disc having friction producing surfaces that extend from a first peripheral surface to a second peripheral surface, said first peripheral surface engaging one of said inner and outer surfaces of said drive ring to establish a torsional coupling, said torsional coupling having sufficient clearance such that any difference in the thermal expansion of said drive ring and said carbon disc resulting from a brake application does not stress the carbon disc, said friction producing surfaces adjacent said second peripheral surface engaging said swept surfaces on adjacent drive rings to inhibit the passage of air to the corresponding first peripheral surfaces on adjacent carbon discs during a brake application.

8. In the wheel and brake assembly, as recited in claim 7 wherein said drive ring and said carbon disc on each friction member are simultaneously moved toward said backing plate by the pressure plate.

9. In the wheel and brake assembly, as recited in claim 8 wherein said pressure plate and backing plate are stator members having friction faces thereon corresponding to said friction members to protect the torsional coupling on adjacent rotor members.

10. In the wheel and brake assembly, as recited in claim 8 wherein said pressure plate and backing plate are stator members having friction faces thereon composed of a carbon disc and metallic drive ring to protect the torsional coupling on adjacent members.

* * * * *